A. H. IHSEN.
TUBE EXPANDER.
APPLICATION FILED MAY 29, 1919.
1,357,059.
Patented Oct. 26, 1920.
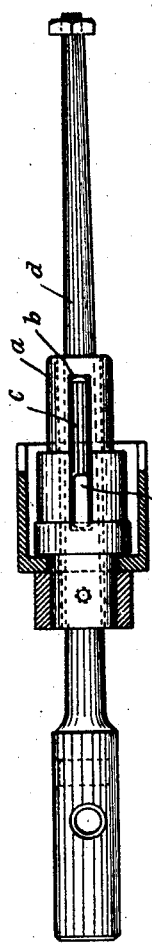
FIG. 1.
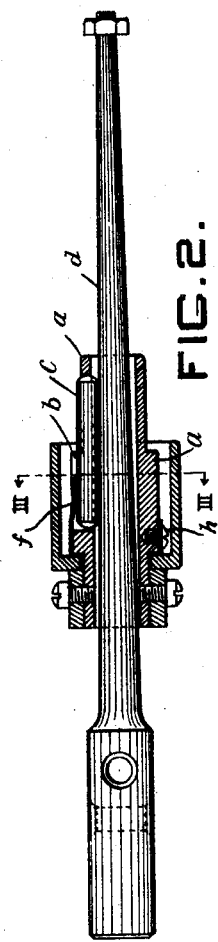
FIG. 2.
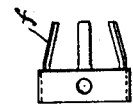
FIG. 5.
FIG. 4.
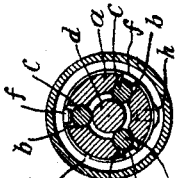
FIG. 3.
FIG. 6.
INVENTOR
Arthur H. Ihsen
by James K. Bakewell
his attorney

UNITED STATES PATENT OFFICE.

ARTHUR H. IHSEN, OF PITTSBURGH, PENNSYLVANIA.

TUBE-EXPANDER.

1,357,059.  Specification of Letters Patent.  Patented Oct. 26, 1920.

Application filed May 29, 1919. Serial No. 300,651.

*To all whom it may concern:*

Be it known that I, ARTHUR H. IHSEN, of the city of Pittsburgh, in the county of Allegheny and State of Pennsylvania, have invented a certain new and useful Improvement in Tube-Expanders, of which the following is a full, clear, and exact description, reference being had to the accompanying drawing, forming part of this specification, in which—

Figure 1 is a side elevation of a tube expander having my improvement, the guard being in section to show the casing; Fig. 2 is a like view, the casing being shown in section; Fig. 3 is a cross section on the line *iii* of Fig. 2; Fig. 4 is an end view of the spring retaining collar detached from the casing; Fig. 5 is a side view of the same; and Fig. 6 is a view of one of the rollers detached.

In expanders for expanding or flaring the ends of small tubes it is impossible to properly contract the casing about the expanding rollers to retain them in position, and the addition of a retaining device has been necessary. But these devices, now in use, have more or less interfered with the movement of the rollers. The object of my invention, therefore, is to provide a retaining device for holding the rollers in place in the casing free to rotate and to move radially to expand the tube.

In the drawing $a$ is a casing having slots $b$ in which rest the expanding rollers $c$ on the tapered rod $d$, which passes through the bore of the casing, and by the advancement of which the rollers $c$ are forced outwardly in the slots $b$ against that portion of the inner circumference of the tube which is to be expanded. This outward movement of the rollers $c$, which are usually three in number, requires that the slots or cavities $b$, be of sufficient area to permit a free movement of the rollers beyond the outer face of the casing, necessitating also a device to prevent the escape of the rollers from the slots when the expander is removed from the tube, and this device consists of a collar $e$, which is preferably split longitudinally, as at $i$, and is provided with resilient tongues $f$, the ends of which, when the collar is fitted around the casing, bear on the rollers $c$ sufficiently to prevent their escape from the slots $b$. The collar $f$ is secured to the casing by a screw $h$, which, however, does not interfere with the force of the spring produced by the split in the collar, which with the spring of the tongues $f$ exerts a yielding pressure on the rollers.

From this description the advantages of my invention should be appreciated by those skilled in the art to which it appertains.

Having thus described my invention, what I claim and desire to secure by Letters Patent is—

In a tube expander, the combination of a casing having longitudinal recesses, rollers fitting within the recesses, a tapered rod fitting within the bore of the casing and bearing against the rollers, a housing secured to said casing and inclosing the rear ends of said rollers, and a collar mounted on the casing within said housing and having resilient tongues which bear on the rear ends of said rollers sufficiently to prevent their escape.

In testimony whereof I have hereunto set my hand.

ARTHUR H. IHSEN.

Witnesses:
ESTELLE MARTIN,
JAMES K. BAKEWELL.